(12) United States Patent
Hansen et al.

(10) Patent No.: US 11,238,075 B1
(45) Date of Patent: Feb. 1, 2022

(54) SYSTEMS AND METHODS FOR PROVIDING INQUIRY RESPONSES USING LINGUISTICS AND MACHINE LEARNING

(71) Applicant: InSkill, Inc., Hopkinton, MA (US)

(72) Inventors: James Hansen, San Jose, CA (US); Dale Calder, Boston, MA (US); Stas Taraschansky, Natick, MA (US)

(73) Assignee: InSkill, Inc., Hopkinton, MA (US)

( * ) Notice: Subject to any disclaimer, the term of this patent is extended or adjusted under 35 U.S.C. 154(b) by 88 days.

(21) Appl. No.: 16/196,776

(22) Filed: Nov. 20, 2018

Related U.S. Application Data

(60) Provisional application No. 62/588,995, filed on Nov. 21, 2017.

(51) Int. Cl.
| | |
|---|---|
| *G06F 7/00* | (2006.01) |
| *G06F 16/33* | (2019.01) |
| *G06N 5/00* | (2006.01) |
| *G06N 20/00* | (2019.01) |
| *G06F 16/35* | (2019.01) |
| *G06F 16/332* | (2019.01) |
| *G06F 40/30* | (2020.01) |
| *G06F 40/40* | (2020.01) |

(52) U.S. Cl.
CPC ...... *G06F 16/3334* (2019.01); *G06F 16/3329* (2019.01); *G06F 16/353* (2019.01); *G06F 40/30* (2020.01); *G06F 40/40* (2020.01); *G06N 5/00* (2013.01); *G06N 20/00* (2019.01)

(58) Field of Classification Search
CPC .............. G06F 16/3334; G06F 16/353; G06F 16/3329; G06F 40/40; G06F 40/56; G06F 16/90332
See application file for complete search history.

(56) References Cited

U.S. PATENT DOCUMENTS

| | | | | |
|---|---|---|---|---|
| 5,574,828 A * | 11/1996 | Hayward | ............... | G16H 50/20 706/45 |
| 8,543,565 B2 * | 9/2013 | Feng | ................... | G06F 16/3329 707/708 |
| 8,983,977 B2 * | 3/2015 | Ishikawa | ............. | G06F 16/3335 707/750 |
| 9,940,658 B2 * | 4/2018 | Delingat | ............ | G06Q 30/0625 |
| 10,019,434 B1 * | 7/2018 | Taubman | ............... | G06F 16/635 |
| 10,147,037 B1 * | 12/2018 | Podgorny | .............. | G06N 5/022 |
| 10,692,006 B1 * | 6/2020 | Zhang | ..................... | G06N 5/022 |
| 2005/0086045 A1 * | 4/2005 | Murata | .................... | G06F 40/20 704/2 |
| 2005/0137723 A1 * | 6/2005 | Liu | .......................... | G09B 7/00 700/45 |
| 2006/0206481 A1 * | 9/2006 | Ohkuma | ............. | G06F 16/3329 |
| 2007/0073651 A1 * | 3/2007 | Imielinski | ............... | G06F 16/24 |

(Continued)

*Primary Examiner* — Mohammed R Uddin
(74) *Attorney, Agent, or Firm* — Gesmer Updegrove LLP

(57) ABSTRACT

A system is disclosed for automatically providing solutions to user questions containing text and data. The system includes a linguistic module to extract keywords from the question text, lookup solutions from a knowledge base that match the keywords, with a score based on the keyword frequency and match, and use a machine learning model trained on previous question data to predict solutions from the question data, with score based on the model's probability, and a combination module for combining the solutions ordered by their respective normalized scores.

16 Claims, 5 Drawing Sheets

(56) References Cited

U.S. PATENT DOCUMENTS

| | | | |
|---|---|---|---|
| 2008/0104065 A1* | 5/2008 | Agarwal | G06Q 10/10 |
| 2008/0201132 A1* | 8/2008 | Brown | G06F 40/30 |
| | | | 704/9 |
| 2009/0012926 A1* | 1/2009 | Ishikawa | G06F 16/3334 |
| | | | 706/47 |
| 2010/0063797 A1* | 3/2010 | Cong | G06F 16/367 |
| | | | 704/9 |
| 2010/0191686 A1* | 7/2010 | Wang | G06F 16/33 |
| | | | 706/46 |
| 2012/0078891 A1* | 3/2012 | Brown | F16H 37/02 |
| | | | 707/723 |
| 2012/0089622 A1* | 4/2012 | Fan | G06F 16/334 |
| | | | 707/749 |
| 2013/0254139 A1* | 9/2013 | Lei | G06N 5/02 |
| | | | 706/11 |
| 2013/0282363 A1* | 10/2013 | Fan | G06F 40/55 |
| | | | 704/9 |
| 2013/0290234 A1* | 10/2013 | Harris | G06N 5/022 |
| | | | 706/46 |
| 2013/0304730 A1* | 11/2013 | Zhou | G06Q 30/02 |
| | | | 707/723 |
| 2014/0006012 A1* | 1/2014 | Zhou | G06F 16/3344 |
| | | | 704/9 |
| 2014/0072948 A1* | 3/2014 | Boguraev | G09B 7/00 |
| | | | 434/362 |
| 2015/0006492 A1* | 1/2015 | Wexler | G06F 16/248 |
| | | | 707/694 |
| 2015/0193798 A1* | 7/2015 | Poreh | G06Q 30/0206 |
| | | | 705/7.31 |
| 2015/0269142 A1* | 9/2015 | Antebi | G06F 40/35 |
| | | | 704/9 |
| 2015/0356142 A1* | 12/2015 | Proux | G06F 16/334 |
| | | | 706/11 |
| 2016/0267392 A1* | 9/2016 | Prager | G06N 7/005 |
| 2017/0091175 A1* | 3/2017 | Kanayama | G06F 16/345 |
| 2017/0199928 A1* | 7/2017 | Zhao | G06F 16/24522 |
| 2017/0323008 A1* | 11/2017 | Makino | G06F 16/3329 |
| 2017/0372696 A1* | 12/2017 | Lee | G10L 15/16 |
| 2018/0137775 A1* | 5/2018 | Byron | G09B 19/0092 |
| 2018/0329883 A1* | 11/2018 | Leidner | G06F 16/2237 |
| 2019/0065576 A1* | 2/2019 | Peng | G06F 16/22 |
| 2019/0108086 A1* | 4/2019 | Yu | G06F 11/0793 |
| 2020/0042597 A1* | 2/2020 | Wu | G06F 16/3329 |

* cited by examiner

Question "Why is the water cloudy" ← 103

Data
    pressure    37.1 ← 104
    Status    "back wash"
    minutes    54
    drain-valve    open Encoded Vector ← 105

Status

| Column | 0 | 1 | 2 | 3 | 4 | 5 |
|---|---|---|---|---|---|---|
| | 37.1 | 0 | 1 | 0 | 54 | 1 |

SYSTEMS AND METHODS FOR PROVIDING INQUIRY RESPONSES USING LINGUISTICS AND MACHINE LEARNING

PRIORITY

The present application claims priority to U.S. Provisional Patent Application Ser. No. 62/588,995 filed Nov. 21, 2017, the disclosure of which is hereby incorporated by reference in its entirety.

BACKGROUND

As products become more connected to networks, such as the Internet, and become more complex because of this interconnectivity, the requirement to provide technical support grows. The most efficient form of support is self-help or automated, where the solution does not require another person. Knowledge bases and FAQs have been browsable or searchable for some time, but place too much burden on the user to know what to search for, and require that the user read through many answers to find the right answer.

There remains a need for systems and method for providing helpful information and improved responses to a widening variety of applications involving interconnectivity.

SUMMARY

In accordance with an embodiment, the invention provides a system for automatically providing solutions to user questions containing text and data. The system includes a linguistic module to extract keywords from the question text, lookup solutions from a knowledge base that match the keywords, with a score based on the keyword frequency and match, and use a machine learning model trained on previous question data to predict solutions from the question data, with score based on the model's probability, and a combination module for combining the solutions ordered by their respective normalized scores.

In accordance with another embodiment, the invention provides a method for automatically providing solutions to user questions containing text and data. The method includes the steps of extracting keywords from the question text, looking up solutions from a knowledge base that match the keywords, with a score based on the keyword frequency and match, using a machine learning model trained on previous question data to predict solutions from the question data, with score based on the model's probability, and combining the solutions ordered by their respective normalized scores.

BRIEF DESCRIPTION OF THE DRAWINGS

The following description may be further understood with reference to the accompanying drawings in which.

The drawings are shown for illustrative purposes only.

DESCRIPTION

In accordance with certain embodiments, the present invention combines a user's question with data collected from a product with which a user is engaged, to make a better recommendation of possible answers. The question and collected data are both input to a search algorithm that returns answers. When a user indicates that one of the answers solved his problem, that answer is correlated to the question and that data is stored so a machine learning algorithm can improve subsequent searches.

Figure 1:
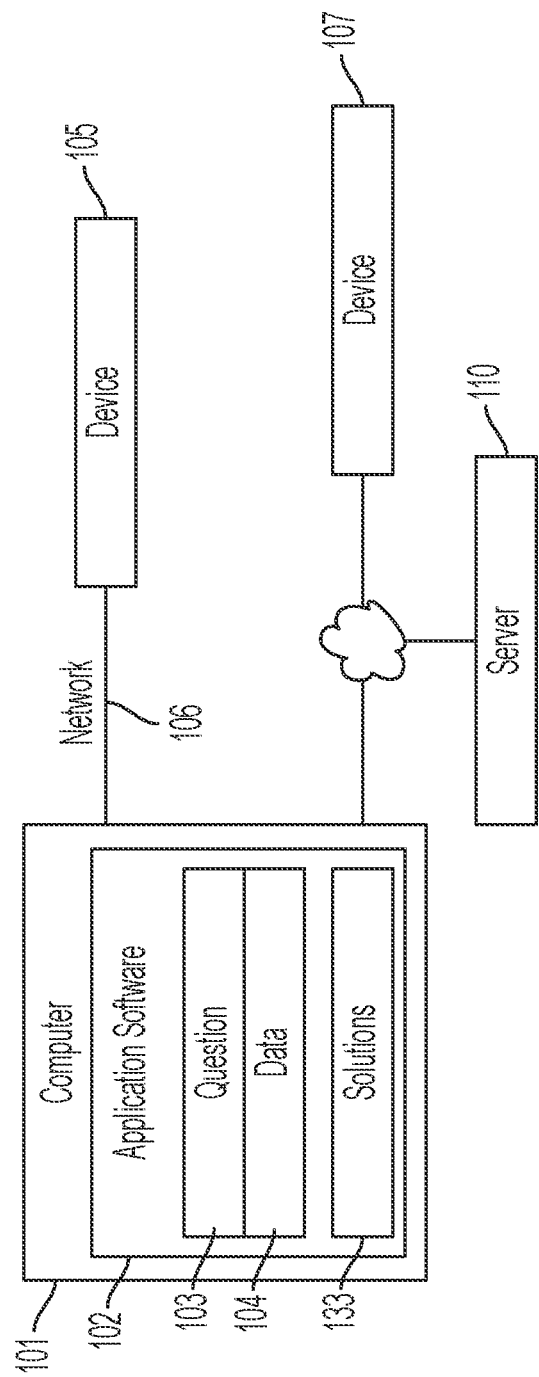
FIG. 1 shows an illustrative diagrammatic view of system in accordance with an embodiment of the present invention.

With reference to FIG. 1, a software program with a user interface (102) runs on a computer (101) such as personal computer or mobile phone or tablet. The software may be connected to another device (105) such that the software provides a remote control or monitoring function to that device. The device may be an industrial machine, or a home automation product, or a vehicle. The device (105) may be connected to the computer through a network (106) such as ethernet, wifi, Bluetooth, Z-Wave, Zigbee, 6LowPAN, etc. A device (107) may also be associated with the software through the internet, without any direct communication protocol between them, such as a smartphone application that is paired with a home security system, or a thermostat, or garage door opener. Because there is no direct communication path between the software and the associated device, an intermediary such as a server (110) is used to broker communication between them.

The software user interface allows a user to ask a question (103). The question may be a support issue such as how to do something within the software. The question may be related to setup or troubleshooting of a connected or associated device. When the user asks a question, the text of that question is combined with data (104) from the software and its environment. Data may be computer versions and capabilities, including networking, Bluetooth, memory, etc. Data may be software version and settings or preferences. Data may also be recent events such as a communications failure, authentication problem or incompatible file. The data depends on the purpose of the application, so each software program will include meaningful data related to its purpose and recent activity.

If software has connected devices (105), such as through a local network or Bluetooth connection or physical connection, then diagnostic data from these devices is also included with the question. Device data may include version, model, connection details, capabilities, and current status. If software has associated devices (107), the identity of those devices is included with the question.

The question and included data is sent to a server (110) through a network such as the internet. If the question includes associated devices (107), the server may send a message to the one or more devices requesting diagnostic data. Each device responds to the message by collecting data about its versions, capabilities and current state. The resulting data is sent back to the server. The data collection message may include parameters or commands that determine which data to collect on the device. When the server has the question and all data collected from any devices, it processes the question.

Figure 2:
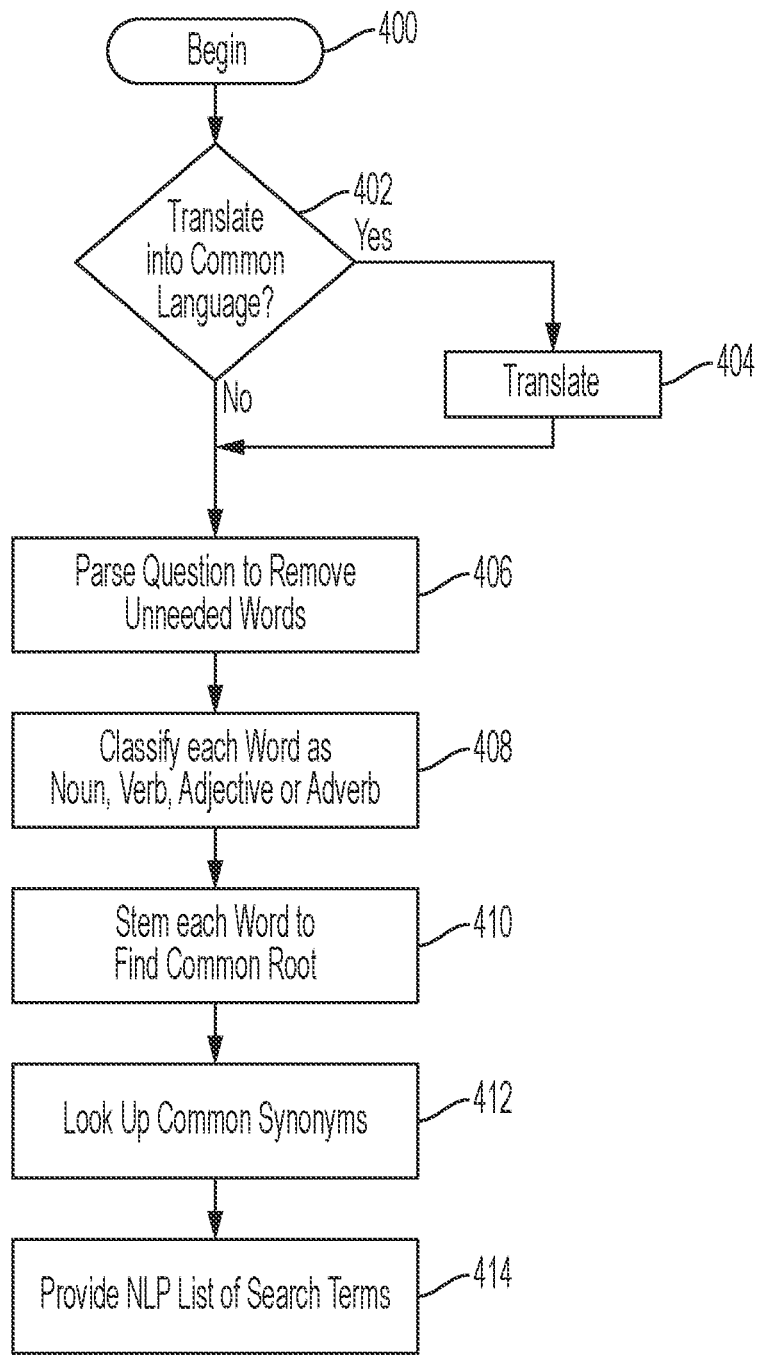
FIG. 2 shows an illustrative diagrammatic view of a processing method in accordance with an embodiment of the present invention.

With reference to FIG. 2, the Processing using Natural Language Processing (120) techniques involves the following steps. The process begins (step 400) by asking whether the question is not in a common language (step 402). If not, the text is translated into that language (step 404). English is often used as the common language because it is understood in many places. The server uses a translation service (e.g., 200 shown in FIG. 3) that takes text from an input language and produces text in an output language. Whether translated or not, the system then parses the question to remove unneeded words, e.g., stop words (step 406), and then classifies each word as a Noun, Verb, or Adjective (parts of speech) (step 408). The system then stems each word (step 410) to get its stem or root word. Stemming combines many forms of a word into the common root so it can be compared or searched. An example of stemming would be that "pay", "paid" and "paying" all reduce to the stem "pay". The system then looks up common synonyms of the stem words so that different words with similar meaning will be included (step 412). The result of this NLP processing (step 414) is a list of search terms (e.g., 121 shown in FIG. 3).

Figure 3:
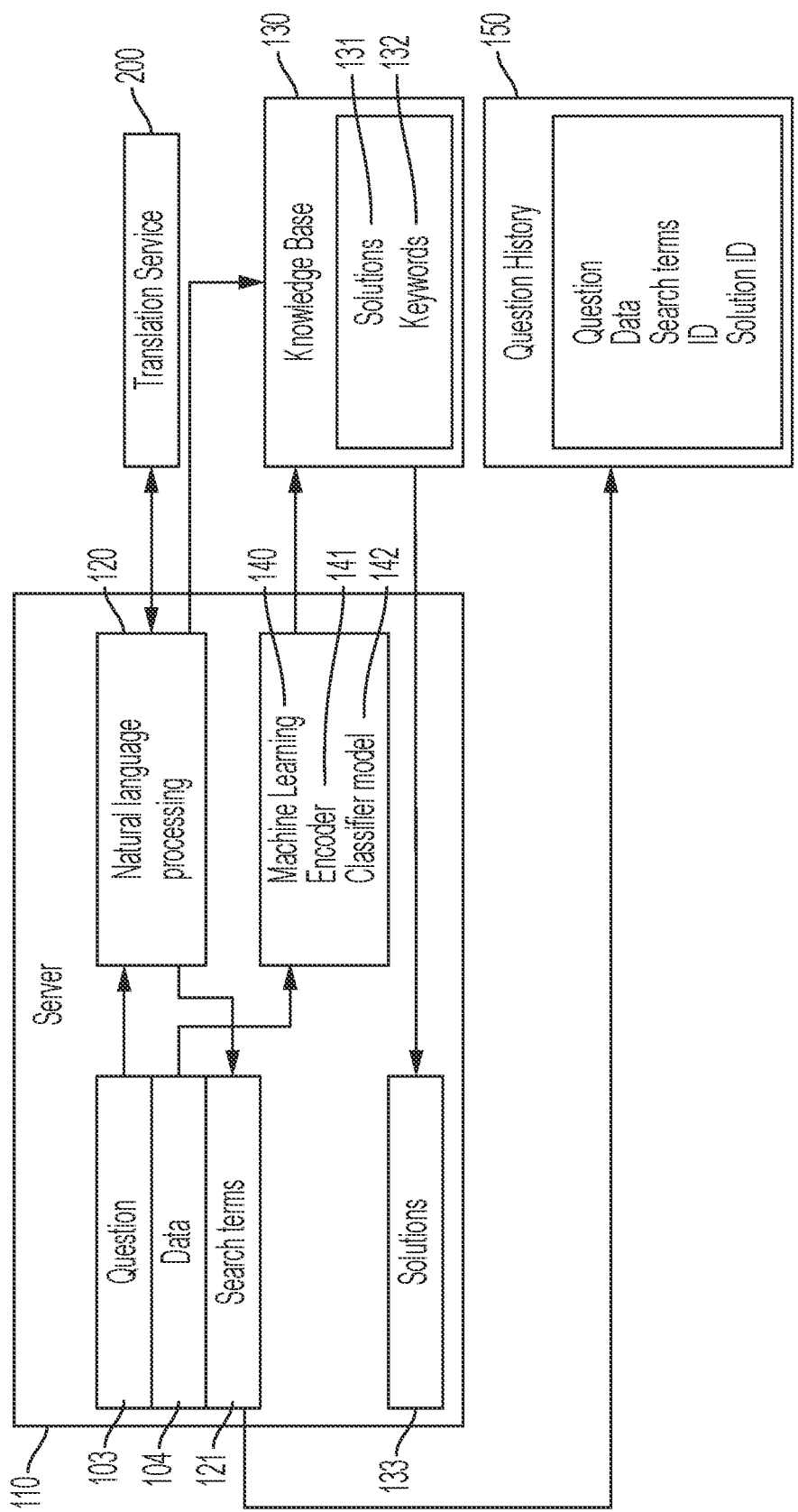
FIG. 3 shows an illustrative diagrammatic view of a system in accordance with another embodiment of the present invention.

With reference to FIG. 3, a Knowledge Base (130) is a collection of Solutions (131) stored in a database. Each solution has a title and a body with text and possibly embedded pictures, videos, files or other media that help explain a solution. A solution may also contain code that will run to automate the actions rather than just instruct the User in those actions. Each solution includes a set of keywords (132). The database can be queried with search terms and responds with entries that match those search terms either in the text of the solution or in the keywords field. ElasticSearch is a database that can be queried with words and it does a full text search for those words within the entries or within fields of each entry. Other databases could also be used such as SQL relational databases, or document-store databases like MongoDB, Couchbase, or CouchDB.

The Knowledge Base is queried with the list of search terms (121) from the processed question text, and a plurality of Solutions (133) are returned. Each solution is assigned a score based on the number and frequency of search terms in its text.

The data included with the question is also used to find solutions. The data may be structured as key-value pairs. The data machine learning (140) encodes the data (141) and from that makes a prediction using the machine learning model (142). The encoder (141) is trained in the steps below so it is ready to process an incoming question. It takes each key and encodes the value into a number suitable for a model to process. Machine learning models learn on a set of vectors of numbers, then make predictions from a vector of numbers where the columns have the same format and meaning. The encoder reads the keys in a defined order and encodes such that an integer or real number represents a continuously variable "reading" such as temperature, hours, or PH. Values that are strings or represent states or enumerations use "1-hot" encoding where multiple columns represent possible values and they are 0 except the matching value which has a 1. The encoder also deals with missing values in the question data. A missing numeric is assigned the average value of that column. A missing string or state value has all 0's assigned to the 1-hot columns because none of them is true.

Figure 5:
FIG. 5 shows an illustrative diagrammatic view of an example of an encoder with a question and data in a system in accordance with an embodiment of the present invention.

An example of the encoder is in FIG. 5, with a question and data (104) that is encoded into a vector (105). The first column represents a value of pressure, the next columns represent the status, assuming there are 3 possible states, and "backwash" is the $2^{nd}$ of these. The next columns show a number and a Boolean for a two state variable.

When the encoder has produced a vector of numbers representing this data, the machine learning model (142) makes a prediction. Since many solutions exist, the model will be a classifier that predicts which class is most likely given the input vector. Many classifiers exist such as Support Vector Machine, Random Forest, Boosted Tree, Neural Network, and many others. The data machine learning applies the classifier selected during training and that classifier model makes a prediction as a set of solutions and the score for each. If any solutions have a prediction above some threshold, they will be returned.

The question and included data, and the NLP parsed text search terms are stored in a database with a question ID (150) so they can be correlated later. The results of the text query and the data machine learning query are solutions (133) that are combined using their scores to rank the solutions. When the solutions are queried from Knowledge Base, the question's original language is used to return solutions in that language. The Knowledge Base stores translations of each solution in the languages that a product may encounter. These solutions are returned to the software, along with the question ID, where the solutions are presented to a user in the order of relevance. The user can evaluate the solutions and choose the best answer.

When the software user chooses a solution that best answers the question, the ID of the solution and the ID of the question are sent to the server as feedback and stored in the question history with the solution's ID stored in the record for the question. Periodically, if any new feedback has occurred, the data machine learning model is retrained. The first step is for the encoder to learn all of the data by iterating the question history and adding each key and the type of its data. For example, string values are added to a dictionary, and numeric values have an average calculated. After learning the data set, it is encoded by iterating the question history again and creating vectors for all the questions. To create the vectors, each question's data keys are processed in the same order, and the values are encoded. A numeric value remains a number. A string is "1-hot" encoded which expands to create a column for each possible value from the dictionary and each column value is 0 except the one that matches is 1. The set of vectors and the IDs of the corresponding solutions are the training data set for a machine learning classifier model. This step may train one or more models with different algorithms or learning parameters to achieve the best accuracy on the training set. The best model is saved to be used for prediction on subsequent questions. In this step, the encoder may optimize the data input to the machine learning model by removing data keys that do not make the predictions stronger. For example if the values of some key do not change, or always change, or otherwise have no correlation to solutions, that key can be removed from the encoding.

At this time, the question history keywords are collected and used to strengthen text lookups. One method is to collect the vocabulary of all the keywords correlated to a particular solution, and then to update that solution's record in the Knowledge Base to include those keywords. From the Knowledge Base, use solution ID to retrieve the solution (131). In a field of the solution's data structure that contains keywords (132), add the vocabulary of keywords if they are not already contained in the keywords. Update the solution in Knowledge Base if the keywords are changed. Other methods may be used such as training a machine learning model on the keywords that correlate to solutions, then predicting from that model.

If the user does not choose a solution that answers the question, they may continue on to interact with a helpdesk Agent to resolve their problem. A helpdesk agent uses helpdesk software (160) that communicates with a central server (110) to view user questions and to provide assistance to them. This interaction involves 2-way messaging (chat) or email messages or other forms of communication.

An alternative learning scenario involves a helpdesk Agent who reviews questions from customers and chooses the best solution for that question. An Agent may also create a new solution and go back to recent questions to find some that would be answered by this new solution. In either case the following flow would be the same.

Figure 4:
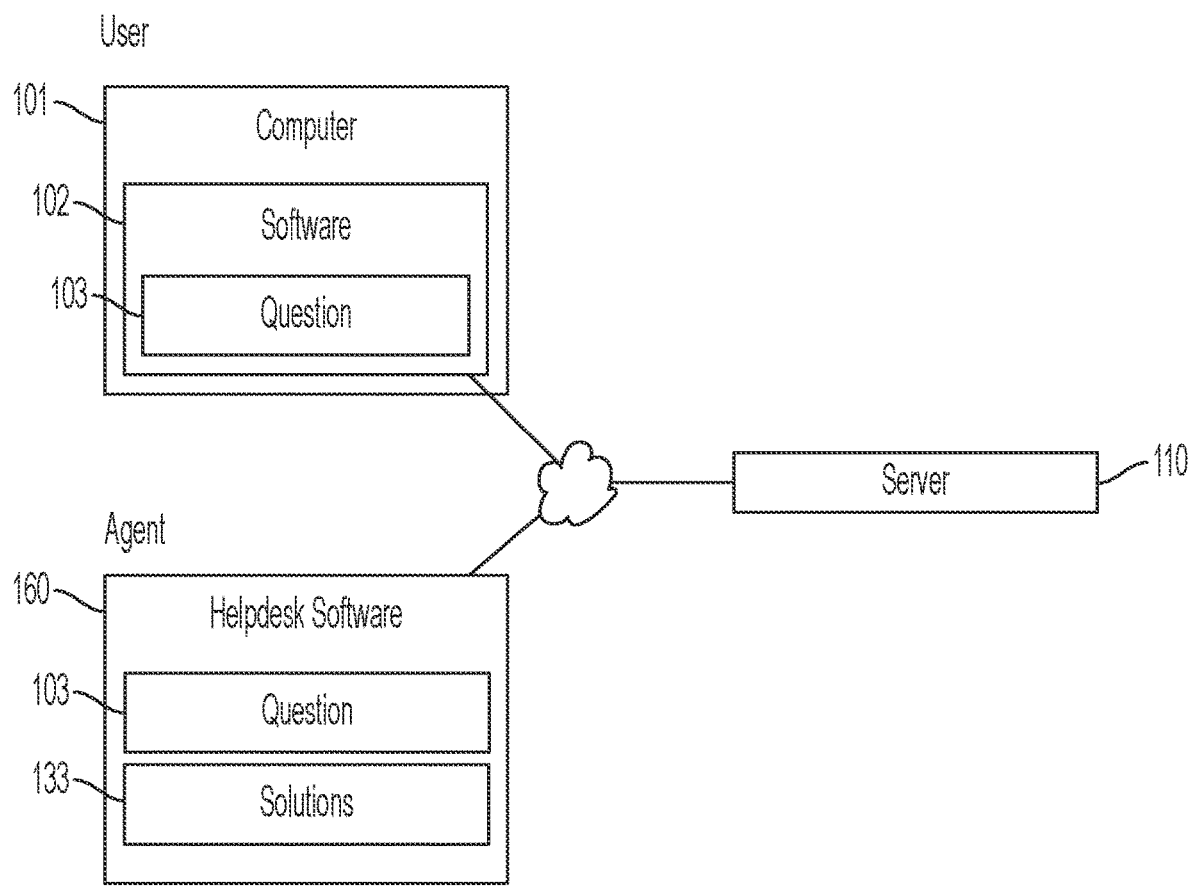
FIG. 4 shows an illustrative diagrammatic view of process flow relationships in a system in accordance with a further embodiment of the present invention.

With reference to FIG. 4, a helpdesk Agent or other product specialist using helpdesk software (160) requests unanswered questions from server history (150) and displays the questions. Questions may be queried or filtered based on some criteria such as most recent, most common question, owned by an agent, or matching some keywords or data values. The agent queries for solutions in knowledge base that would answer a particular question. When agent chooses the solution that best answers that question, the question ID and solution ID are sent back to server as feedback. The steps of the feedback process are the same as above when a user submitted the feedback.

The Agent training process can take place when new solutions are created in the Knowledge Base, to train the real world questions and data that correlate to that solution. Agent training can also review any questions that were not resolved automatically. If the User did not choose one solution as the best answer, the question may have escalated to a helpdesk Agent who works with the User to resolve the question. When they are finished with that question, the Agent can choose the solution that was the best answer. This process trains the machine learning so the next question has a better chance of automatically finding the right solution.

In accordance with various embodiments, therefore, the invention provides a system and method that translate queries into a common language so the ML can strengthen correlations regardless of original language. The system may use Machine Learning by translating a question to a common language, use Natural Language Processing and Machine Learning techniques in that language to find search terms, and a Machine Learning model to find closest matching answers, where the Machine Learning correlates previous terms in the common language to answers. In accordance with further embodiments, the matching answers may be sent to a user translated in the original language of the question.

In accordance with further embodiments, the invention provides linguistic analyses and machine learning to answer questions in a method for automatically providing answers to user questions. The method includes linguistic methods to extract keywords from the user question, lookup solutions from a knowledge base that match those keywords, with a score based on the keyword frequency and match, and comprising methods that use a machine learning model trained on previous questions to lookup closest solutions, with score based on the model's proximity, and combining those solutions ordered by their respective normalized scores.

In accordance with further embodiments, the invention provides a method for automatically providing answers to user questions in a software application. The method includes a user entering a question, the software collecting data about the context and recent operation of the software and connected hardware or devices, apply linguistic methods to the question to lookup answers, and apply machine learning methods to the collected data that correlates data values to answers, then combining a plurality of answers ordered by score to present to the user.

In accordance with further embodiments, the invention provides machine learning from user questions and chosen answer in a method for improving answers in response to a question using machine learning. The method includes a user asking a question, a plurality of answers returned to that user based on machine learning model, the user selecting the best answer, and using that answer as feedback to the machine learning, where the original question and any associated data are used as training data to a machine learning model that correlates the question text and associated data with the best answer.

In accordance with a further embodiment, the invention provides agent training ML answers in a method for providing an optimal solution in response to a question using machine learning. The method includes storing a history of questions and associated data, a collection of solutions, a machine learning model, where an agent views a plurality of recent questions, and for a single question, chooses an optimal solution from the collection of solutions, the machine learning model adding the text and associated data from the single question into the model's training data correlated with the chosen optimal solution.

Those skilled in the art will appreciate that numerous modifications and variations may be made to the above disclosed embodiments without departing from the spirit and scope of the present invention.

What is claimed is:

1. A system for automatically providing solutions to user questions relating to an operation of an industrial machine, the system comprising:
   a linguistic module that executes on a computer to extract keywords from a question text relating to an operation of an industrial machine, lookup a first plurality of solutions from a knowledge base that match said keywords, and assign each of the first plurality of solutions with a first score based on a number or a frequency of matching keywords in a text of the solution;
   a machine learning module that executes on the computer to provide a predictive model trained on previous diagnostic data and corresponding solutions relating to the operation of other industrial machines, use the predictive model to predict a second plurality of solutions based on non-textual diagnostic data generated by the industrial machine, and assign each of the second plurality of solutions with a second score based on a model probability associated with the solution, wherein the non-textual diagnostic data represents at least a current state of the industrial machine, and
   a combination module that executes on the computer to combine the first plurality of solutions and the second plurality of solutions in a ranked order determined by the first score and the second score of each solution.

2. The system as claimed in claim 1, wherein the system further includes a translation module that executes on the computer for translating the question text into a common language.

3. The system as claimed in claim 1, wherein the system further provides a linguistic analysis of the question text.

4. The system as claimed in claim 3, wherein the linguistics analysis includes parsing the question text and classifying words in said text.

5. The system as claimed in claim 1, wherein the machine learning module encodes the non-textual diagnostic data generated by the industrial machine into a numerical format suitable for prediction.

6. The system as claimed in claim 1, wherein the machine learning module selectively excludes a portion of the diagnostic data having no correlation for predicting the second plurality of solutions.

7. The system as claimed in claim 1, wherein the question text further includes an identity of the industrial machine, and wherein the computer is further configured to transmit a request for the non-textual diagnostic data to the industrial machine identified in the question text, receive the non-textual diagnostic data generated by the industrial machine in response to the request, and predict the second plurality of solutions using the machine learning model based on the non-textual diagnostic data received from the industrial machine.

8. The system as claimed in claim 1, wherein the operation of an industrial machine includes at least one of a setup operation and a troubleshooting operation of the industrial machine.

9. A method for automatically providing solutions to user questions relating to a device, the method comprising:
   extracting keywords from a question text relating to an operation of an industrial machine;
   looking up a first plurality of solutions from a knowledge base that match said keywords;
   assigning each of the first plurality of solutions with a first score based on a number or a frequency of matching keywords in a text of the solution;
   obtaining non-textual diagnostic data generated by the industrial machine, wherein the non-textual diagnostic data represents at least a current state of the industrial machine;
   predicting a second plurality of solutions using a machine learning model based on the non-textual diagnostic data generated by the industrial machine, the machine learning model being trained on previous diagnostic data and corresponding solutions relating to the operation of other industrial machines;
   assigning each of a second plurality of solutions with a second score based on a model probability associated with the solution; and
   combining the first plurality of solutions and the second plurality of solutions in a ranked order determined by the first score and the second score of each solution.

10. The method as claimed in claim 9, further comprising translating the question text into a common language.

11. The method as claimed in claim 9, further comprising providing a linguistic analysis of the question text.

12. The method as claimed in claim 11, wherein providing the linguistics analysis includes parsing the question text and classifying words in said text.

13. The method as claimed in claim 9, further comprising encoding the non-textual diagnostic data generated by the industrial machine into a numerical format suitable for prediction.

14. The method as claimed in claim 9, further comprising selectively excluding a portion of the diagnostic data that has no correlation for predicting the second plurality of solutions.

15. The method as claimed in claim 9, wherein the question text further includes an identity of the industrial machine, the method further comprising:
   transmitting a request for the non-textual diagnostic data to the industrial machine identified in the question text;
   receiving the non-textual diagnostic data generated by the industrial machine in response to the request; and
   predicting the second plurality of solutions using the machine learning model based on the non-textual diagnostic data received from the industrial machine.

16. The method as claimed in claim 9, wherein the operation of an industrial machine includes at least one of a setup operation and a troubleshooting operation of the industrial machine.

\* \* \* \* \*